US012586622B2

(12) United States Patent
Condorelli et al.

(10) Patent No.: US 12,586,622 B2
(45) Date of Patent: Mar. 24, 2026

(54) DIGITAL DEVICE HAVING A RESET PAD CIRCUIT THAT MAY BE SUBJECT TO HACKER ATTACK

(71) Applicant: STMicroelectronics International N.V., Geneva (CH)

(72) Inventors: Riccardo Condorelli, Catania (IT); Antonino Mondello, Messina (IT); Michele Alessandro Carrano, Catania (IT); Michele Bottaro, Lentini (IT); Salvatore Costa, Partinico (IT); Jacques Talayssat, Opio (FR)

(73) Assignee: STMicroelectronics International N.V., Geneva (CH)

( * ) Notice: Subject to any disclaimer, the term of this patent is extended or adjusted under 35 U.S.C. 154(b) by 162 days.

(21) Appl. No.: 18/410,049

(22) Filed: Jan. 11, 2024

(65) Prior Publication Data

US 2024/0242749 A1    Jul. 18, 2024

(30) Foreign Application Priority Data

Jan. 12, 2023    (IT) ........................ 102023000000327

(51) Int. Cl.
*G11C 7/20*        (2006.01)
*G11C 7/24*        (2006.01)
(Continued)

(52) U.S. Cl.
CPC .................. *G11C 7/24* (2013.01); *G11C 7/20* (2013.01); *G06F 1/24* (2013.01); *G06F 11/1441* (2013.01); *G06F 21/75* (2013.01)

(58) Field of Classification Search
CPC .... G11C 7/24; G11C 7/20; G06F 1/24; G06F 11/1441; G06F 21/75; G06F 7/20; G06F 7/24
(Continued)

(56) References Cited

U.S. PATENT DOCUMENTS 5,748,948 A      5/1998  Yu et al.
8,601,254 B1 *  12/2013  Kutz ............. H03K 19/018592
                                              326/38

(Continued)

FOREIGN PATENT DOCUMENTS

CN      205263743 U    5/2016
CN      105404374 B    11/2018

OTHER PUBLICATIONS

IT Search Report and Written Opinion for priority application, IT Appl. No. 102023000000327, report dated Jul. 24, 2023, 7 pgs.

*Primary Examiner* — Ly D Pham

(74) *Attorney, Agent, or Firm* — Crowe & Dunlevy LLC

(57)        ABSTRACT

A reset pad circuit has first and second inputs coupled, respectively, to a first reset access port receiving a first reset request and a second reset access port. The reset pad circuit generates a first reset state signal. An internal reset activation gate has inputs coupled to internal resources and an output that applies a reset request to the second reset access port. A memory element has first and second inputs coupled, respectively, to the output of the reset activation gate and the output of the reset pad circuit. The memory element generates a second reset state signal when receiving the reset request until receiving the first reset state signal. A reset forward gate coupled to outputs of the reset pad circuit and the memory element generates a system reset request in response to the first reset state signal or the second state signal.

14 Claims, 10 Drawing Sheets

(51) Int. Cl.
    *G06F 1/24*            (2006.01)
    *G06F 11/14*         (2006.01)
    *G06F 21/75*         (2013.01)

(58) Field of Classification Search
    USPC ..................................................... 365/185.04
    See application file for complete search history.

(56)                 References Cited

U.S. PATENT DOCUMENTS

| | | | | |
|---|---|---|---|---|
| 2007/0069786 A1* | 3/2007 | Chung | ................. | H03K 3/0375 |
| | | | | 327/198 |
| 2014/0003170 A1* | 1/2014 | Ku | ................. | G01R 31/318555 |
| | | | | 324/538 |
| 2014/0064014 A1* | 3/2014 | Cho | ......................... | G11C 8/06 |
| | | | | 365/230.08 |
| 2017/0061137 A1 | 3/2017 | Rabefarihy et al. | | |
| 2020/0310663 A1* | 10/2020 | Kwak | .................... | G11C 7/109 |
| 2021/0192089 A1 | 6/2021 | Weiner et al. | | |
| 2022/0308892 A1* | 9/2022 | Colombo | ............. | G06F 9/4403 |

* cited by examiner

DIGITAL DEVICE HAVING A RESET PAD CIRCUIT THAT MAY BE SUBJECT TO HACKER ATTACK

PRIORITY CLAIM

This application claims the priority benefit of Italian Application for Patent No. 102023000000327 filed on Jan. 12, 2023, the content of which is hereby incorporated by reference in its entirety to the maximum extent allowable by law.

TECHNICAL FIELD

The present invention relates to a digital device having a reset pad circuit that may be subject to hacker attack.

BACKGROUND

As is known, present digital devices, such as microcontrollers, Systems-On-Chip (SOC) and the like, often have a pad that is open to the outside for activating a reset operation. For example, this may be useful in certain situations where it is desired that the device is brought to a known status and/or when the device has to undergo a function interruption, and a re-start of the device is desired.

A problem with reset pads accessible from the outside is that they may be subject to a hacker attack. Many different attacks are possible, including mechanical attack, chemical attack or focused ion beam attack.

If an attack occurs when the device is not under reset, serious safety and security problems may occur and may affect the entire device or system they are integrated into.

In fact, present devices often use the reset condition to perform security activities to avoid any propagation of the attack. However, if the attack is directed against the reset pad circuit and causes a severe damage thereof, the device may not be in a condition to activate the reset procedures and enact safety procedures.

Thus, there is a need in the art to overcome the above-noted drawbacks and limitations by providing a solution able to detect and/or protect the device from attacks directed the reset pad circuit.

SUMMARY

In an embodiment, a digital device comprises: a reset pad circuit having a first input coupled to a first reset access port and configured to receive a first reset request, a second input coupled to a second reset access port, and an output, wherein the reset pad circuit is configured to generate a first reset state signal; a reset request propagating portion coupling the second input to the output of the reset pad circuit; an internal reset activation gate having at least one input coupled to an internal resource and an output coupled with the second reset access port of reset pad circuit, wherein the internal reset activation gate is configured to generate a reset request; a memory element having a first input coupled to the output of the reset activation gate, a second input coupled to the output of the reset pad circuit, and an output, wherein the memory element is configured to generate a second reset state signal when receiving the reset request until receiving the first reset state signal; a reset forwarding gate coupled to the outputs of the reset pad circuit and the memory element and configured to generate a system reset request in presence of the first reset state signal and/or the second reset state signal.

BRIEF DESCRIPTION OF THE DRAWINGS

For the understanding of the present invention, embodiments thereof are now described, purely as a non-limitative example, with reference to the enclosed drawings, wherein.

DETAILED DESCRIPTION

Figure 1:
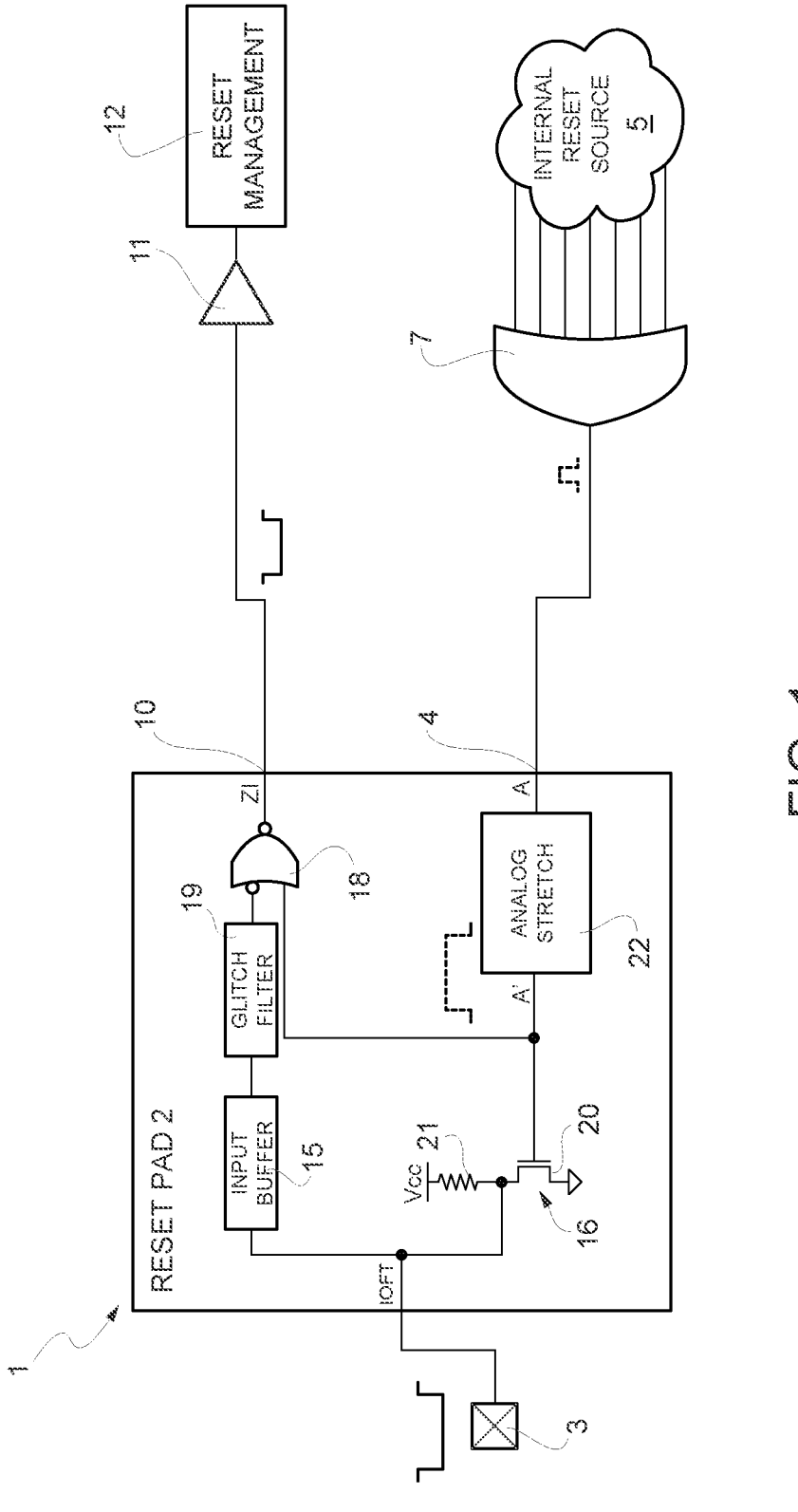
FIG. 1 is a schematic block diagram of a digital device having a reset pad circuit that may subject to a reset pad circuit attack.

FIG. 1 shows a device 1 of digital type, for example a microcontroller, having a reset pad circuit 2. Device 1 may also represent a complex system, for example a system-on-chip, so-called SOC. In the latter case, the reset pad circuit 2 and the reset structure shown in FIG. 1 are generally integrated in a same die, although some parts may be integrated in different dice, as discussed below.

Reset pad circuit 2 may be easily accessed and localized from the exterior, in order to allow activation of a reset from outside, for example by other devices of the same SOC or other devices operationally coupled thereto.

Reset pad circuit 2 is coupled to an external access 3 that is configured to receive an external reset request IOFT.

Reset pad circuit 2 has also an internal reset input 4 configured to receive an internal reset request A. Internal reset input 4 may be connected to a plurality of internal resources of the device 1, represented in FIG. 1 as a whole as internal reset sources 5.

Internal reset sources 5 may comprise any circuit, stage, unit, sub-device or even a software/firmware entity that can generate the internal reset request A.

The internal reset source 5 may include reset sources that may not be or may not completely be integrated or contained in the same die as the reset pad circuit 2.

In FIG. 1, the requests of the internal resources 5 are fed through an internal resource OR gate 7 having an output coupled to internal reset input 4 of the reset pad circuit 2.

Reset pad circuit 2 also has a pad output 10 outputting a reset state signal ZI and coupled, through an input buffer 11, to a portion of the device 1 configured to manage a reset operation, indicated generally as reset manager 12.

As above indicated, the reset manager 12 may activate a reset operation of the device 1, as defined in a design step. In addition, reset manager 12 may activate and/or enact protection activities for the device 1 and any resource thereof.

Reset manager 12 may be integrated in the same die as the reset pad circuit 2 or in a different die, and be coupled thereto through an output pad.

Reset pad circuit 2 may have a general structure as shown in FIG. 1, where external access 3 is coupled to an input buffer 15 and to a terminal of a biasing element 16.

Input buffer 15 is coupled to an inverted input of a reset NOR gate 18. A glitch filter 19 may be coupled between the input buffer 15 and reset NOR gate 18 to filter out noise existing on external access 3 and that may cause an undesired reset.

Biasing element 16 is here formed by a transistor 20 that has a conduction terminal coupled to a reference potential line, for example power supply Vcc, through a resistor 21, and to external access 3; a second terminal coupled to another reference potential line, for example ground; and a control terminal coupled to internal reset input 4 through an analog stretch block 22.

Analog stretch block 22 may be any digital block or circuit that stretches the pulse length of the internal reset request A received on the internal reset input 4 to allow a sufficient time to perform reset (for example at least 20 μs).

Stretched internal reset signal generated by analog stretch block 22 is indicated in the drawings by A'.

The control terminal of transistor 20 and the output of analog stretch block 22 are coupled to a second, not inverted, input of reset NOR gate 18.

In the device 1, starting from an inactive or rest state, wherein the external access 3 is high and the internal reset input 4 is low, when a reset input is received (falling edge of external reset request IOFT), the reset NOR gate 18 switches to low and passes this information, through reset state signal ZI, to the reset manager 12, that activates the reset procedure as well as any protection activity. When external reset request IOFT switches again to high, the circuit returns to the inactive state.

Analogously, as shown by hatched lines, when an internal reset request A is received at the internal reset input 4, the reset NOR gate 18 switches to low, activating the reset procedure. The reset state is ended when the stretched internal reset signal A' generated by the analog stretch block 22 switches back to low.

In addition, in case of generation of an internal reset request, the information of the reset state is propagated to the external access 3 by switching on of transistor 20 that causes external access 3 to switch to low state, thereby generating an information that an internal reset request is present, if useful.

In the device 1, an attack on the reset pad circuit 2, which, as said, is easily accessed from the outside, may cause a disrupt of the standard operations and may jeopardize the device.

In fact, an attack may cause the voltage level on the external access 3 to be unstable or undefined; propagation of this condition to the reset manager 12 may prevent activation of the reset procedure or cause invalidation of security actions based on system reset. If this happens while the device or system clock is running, this may cause execution of possible hacked firmware.

Figure 2:
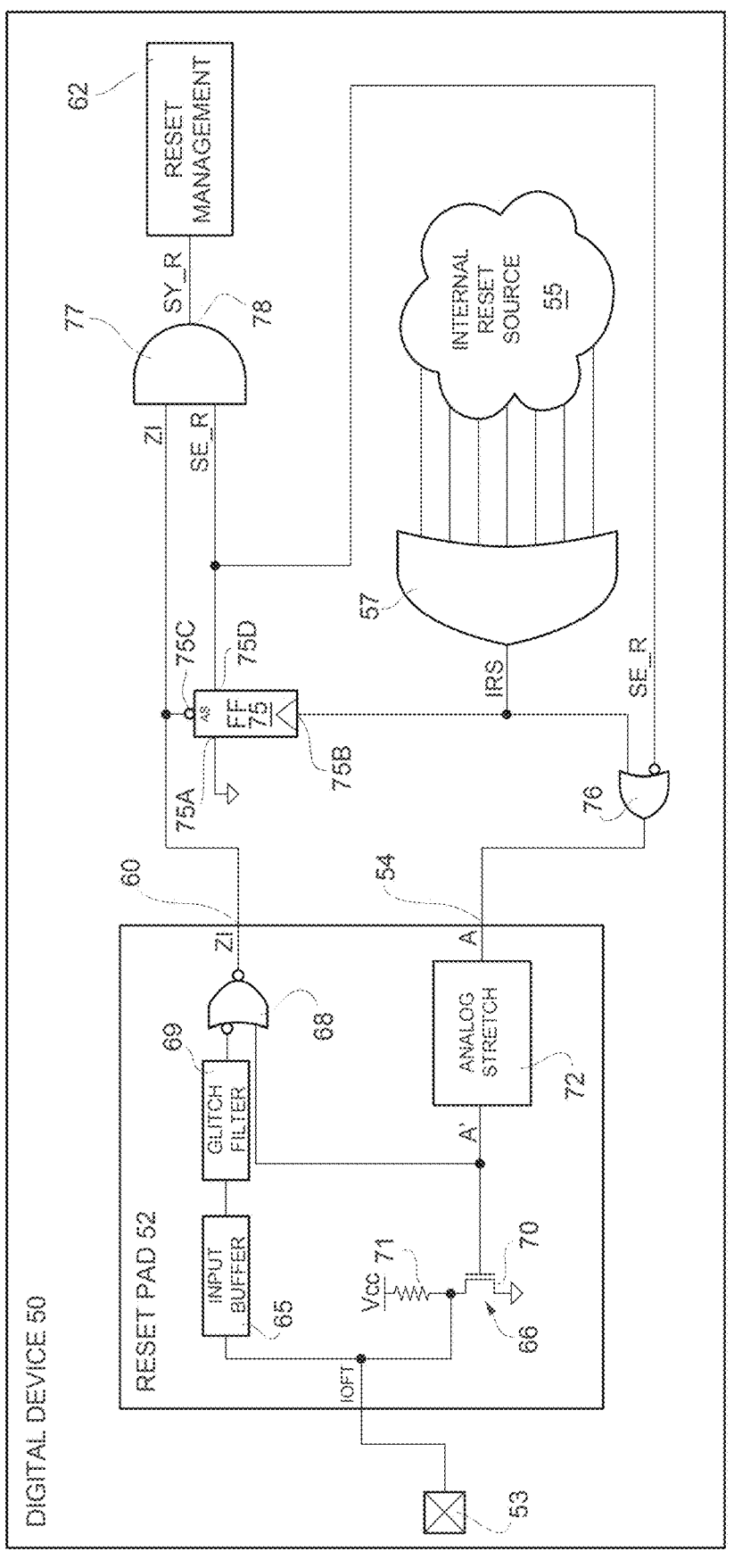
FIG. 2 is a schematic block diagram of an embodiment of the present digital device having a protection portion.

FIG. 2 shows a device 50 that avoids the above possible risky condition.

Device 50 operates to assert the system reset independently from any state or condition on the reset pad circuit by introducing a by-pass path that anticipates the reset request to the reset manager 12.

In addition, device 50 operates to maintain the reset condition, as started internally, until the reset condition progresses and is fed back by the external recess asserting path.

In detail, device 50 is a digital device, analogously to device 1 of FIG. 1.

Device 50 has a reset pad circuit 52 that may have the same structure as reset pad circuit 2 of FIG. 1. Therefore, parts of the device 50 corresponding to parts of the device 1 of FIG. 1 have been designed with reference numbers increased by 50.

In particular, reset pad circuit 52 includes an input buffer 61, a glitch filter 69, a reset NOR gate 68, an analog stretch block 72 (supplying stretched internal reset signal A'), a transistor 70 and a resistor 71, coupled as above described for the corresponding elements of FIG. 1.

Input buffer 61 (when present), glitch filter 69 and reset NOR gate 68 form a reset request propagating portion.

Reset pad circuit 52 also has an external access 53, receiving external reset request IOFT; an internal reset input 54, receiving an internal reset request A, and a reset pad circuit output 60, outputting a reset state signal ZI (also called feedback reset state signal ZI).

In addition, device 50 has an internal resource OR gate 57 coupled to at least one, here a plurality of internal reset sources 55. Internal resource OR gate 57, forming an internal reset activation gate, may be integrated or not in the same die as reset pad circuit 52, analogously to what described for device 1 of FIG. 1. For example, internal reset sources may include devices able to detect specific attacks; a software application; a watchdog in case the device 50 does not react anymore and other similar devices/applications.

In device 50 of FIG. 2, the internal resource OR gate 57 has its output (supplying internal reset signal IRS) coupled to a flip-flop 75 and to a feedback OR gate 76.

Flip-flop 75 (forming a memory element) is a D-type flip-flop, having a data input 75A; a reset (asynchronous) input 75B; a set (inverted, asynchronous) input 75C; and an output 75D.

Data input 75A is coupled to a reference potential line, here ground.

Reset input 75B is coupled to the output of internal resource OR gate 57.

Set input 75C is coupled to reset pad circuit output 60.

Output 75D of the flip-flop 75 (which supplies a secure reset signal SE_R, also called second reset state signal) is coupled to a first input of an AND gate 77; AND gate 77 has a second input coupled to reset pad circuit output 60.

AND gate 77 forms a reset forwarding gate and has an output 78 supplying a system reset signal SY_R. In FIG. 2, output 78 of AND gate 77 is coupled to a reset manager 62, that may be integrated in the same die as the reset pad circuit 52 or not, depending on the system design, and may comprise any hardware and/or software resource, as above discussed for device 1.

Feedback OR gate 76 (forming an internal reset maintaining unit) has here a first (not inverted) input coupled to the output of internal resource OR gate 57; a second (inverted) input coupled to output 75D of flip-flop 75; and an output (supplying the internal reset request A) coupled to internal reset input 54 of reset pad circuit 52.

Device 50 operates as below discussed in detail, making also reference to FIG. 3, wherein times are not in scale and only represent the sequence of switching operations in device 50.

Device 50 operates analogously to device 1 of FIG. 1 in case of external reset (times t1-t6).

At time t0, in absence of any reset request ("idle state" of the reset portion), the device 50 is in a standard operative condition and the reset portion shown in FIG. 2 is inactive.

In particular, external reset request IOFT, reset state signal ZI, secure reset signal SE_R, and system reset signal SY_R are high, while internal reset signal IRS, internal reset request A and stretched internal reset signal A' are low.

At time t1, an external request is applied to external access 53, by switching external reset request IOFT to low; thus, at time t2, due to commutation of reset NOR gate 68, reset state signal ZI also switches to low and, at time t3, due to commutation of AND gate 77, system reset signal SY_R also switches to low, causing reset manager 62 to initiate a reset operation and to perform any security action provided for in device 50.

In this period, generally, no reset request from the internal reset sources 55 is generated; therefore, internal reset signal IRS remains low; and internal resource OR gate 57, flip-flop 75, and feedback OR gate 76 do not change state.

When external reset request IOFT switches back to the high state, reset is ended and the device 50 returns back in its idle state. In particular, reset state signal ZI and system reset signal SY_R switch again to high.

In case of an internal reset request, when any of the internal reset resources 55 generates a device reset pulse, internal reset signal IRS switches to high (time t7).

Switching of internal reset signal IRS, at reset (clock) input 75B, causes flip-flop 75 to change state (time t8), also because set input 75C (which has priority, but is active when low) is at high level; thus, secure reset signal SE_R switches to low, causing system reset signal SY_R to switch to low (time t9) and to activate a reset operation.

Figure 3:
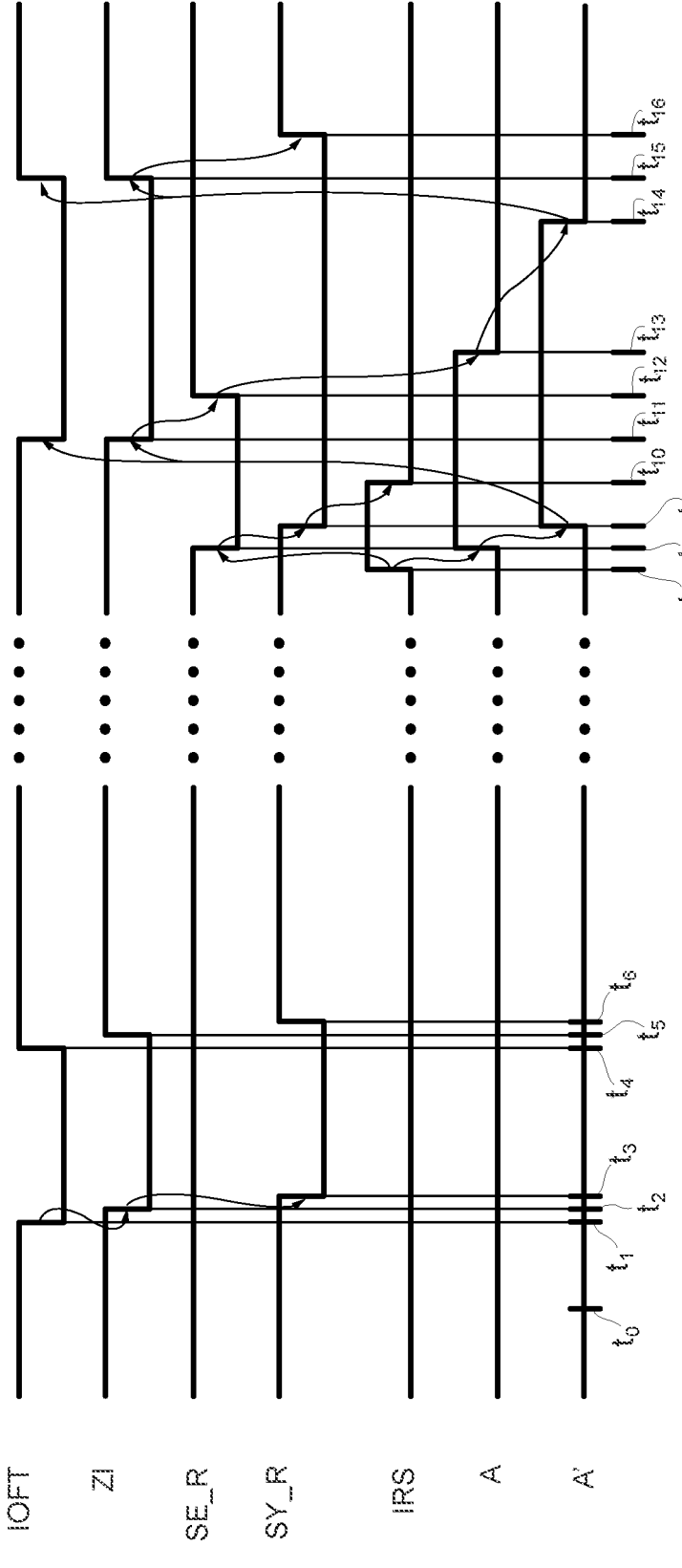
FIG. 3 shows the timing of signals in the digital device of FIG. 2 in two different operational conditions, where times are not in scale.

In addition, switching of internal reset signal IRS causes commutation of internal reset request A to high (this switching occurring independently from, but at about the same time as switching of secure reset signal SE_R and thus has been indicated in FIG. 3 at the same time t8).

At time t9, stretched internal reset signal A' also switches to high, activating the reset pad circuit 52, as discussed below.

In the meantime, after receiving the system reset signal SY_R, the reset manager 12 activates all the actions connected with a reset state, including stopping all the operations of the various units/parts of device 50, including the internal reset sources 55 that has started the reset procedure (except, of course, any parts that have been specifically designed to operate in reset condition).

As a consequence, internal reset signal IRS switches to low, time t10. However, flip-flop 75 does not change state and secure reset signal SE_R remains low, due to the high value of reset state signal ZI. Thus, feedback OR gate 76 is maintained in its state and internal reset request A remains high.

At time t11, transistor 66 is turned on by stretched internal reset signal A' and causes external access 53 to go low (external reset request IOFT goes to "0"). Thus, any external resource coupled to external access 53 is informed of the reset state of device 50.

The high level of stretched internal reset signal A' is also propagated to reset NOR gate 68, that causes reset state signal ZI to switch to low (also indicated at time t11, although generally not occurring simultaneous with switching of external reset request IOFT to low, but generally occurring earlier.

System reset signal SY_R is thus confirmed low.

Switching of the signal (reset state signal ZI) on set input 75C of flip-flop 75C causes switching of the output 75D thereof to high, time t12. However, AND gate 77 does not change state, due to low level of reset state signal ZI, as said.

Switching of secure reset signal SE_R to high at time t12 causes feedback OR gate 76 to change state, also due to the low level of internal reset signal IRS; thus internal reset request A switches to low (time t13) and, after a while, also stretched internal reset signal A' switches to low (time t14), causing the end of the reset condition at reset pad circuit 52 (time t15, with external reset request IOFT and reset state signal ZI switching again to high, also here, generally not simultaneously) and, as a consequence, of the entire device 50 (switching of system reset signal SY_R to high, time t16).

The device 50 is thus again in operative condition and the reset portion of FIG. 2 is in the state discussed with reference to time t0.

Figure 4:
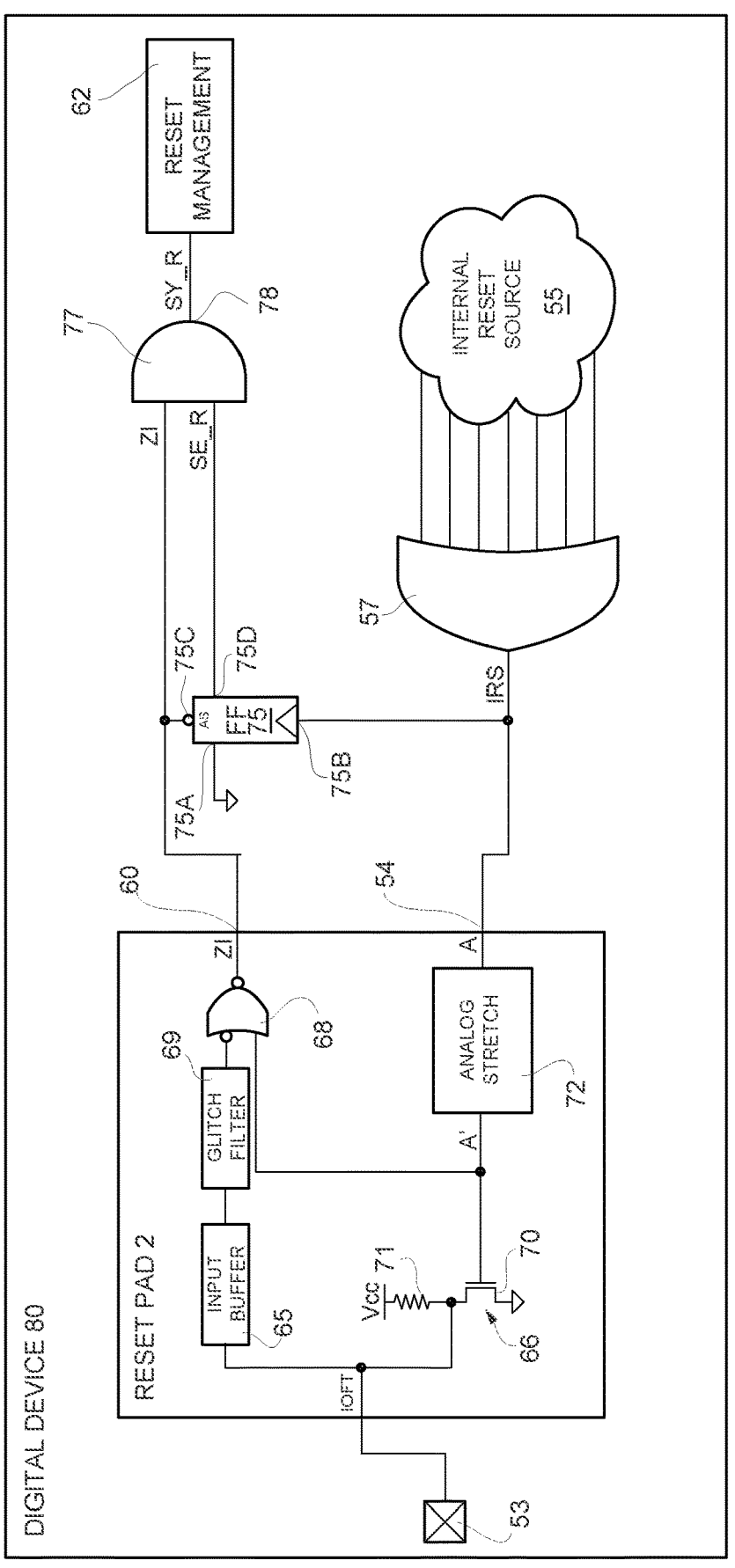
FIGS. 4-6 are schematic block diagrams of other embodiments of the present digital device with a protection portion.

FIG. 4 shows a digital device 70, wherein the output of internal resource OR gate 57 is directly connected internal reset input 54 and thus no feedback connection exists from the output 75D of flip-flop 75.

Digital device 70 has a similar behavior as discussed above with reference to FIG. 3.

In detail, when an internal reset request is generated by any of the internal rest sources 55, internal reset signal IRS switches to high, causing commutation of flip-flop 75; secure reset signal SE_R switches to low, causing also system reset signal SY_R to switch to low and to activate a reset operation.

In addition, internal reset request A and stretched internal reset signal A' switch to high, activating the reset pad circuit 52, analogously to what described above at time t11 of FIG. 3.

Propagation of the activation pulse of stretched internal reset signal A' to reset NOR gate 68 causes reset state signal ZI to switch to low and confirm a reset request at the second input of AND gate 77.

Switching of reset state signal ZI on set input 75C of flip-flop 75C causes the latter to be set; thereby, secure reset signal SE_R switches again to high, as discussed in FIG. 3 at time t12. Also here, due to high level of reset state signal ZI, AND gate 77 does not change state.

Differently from device 50 of FIG. 2, when the reset pulse of internal reset signal IRS ends and internal reset signal IRS switches back to high, after a while, due to the delayed falling edge of internal reset signal A', the reset condition at reset pad circuit 52 ends, with external reset request IOFT and reset state signal ZI switching again to high and, as a consequence, system reset signal SY_R switching to high, analogously to what described with reference to FIG. 3 at times t15 and t16.

This solution may be used when the reset request from the one of the internal reset sources 55 is maintained for a sufficient time to activate its propagation from the internal reset input 54 to the reset pad circuit output 60 while system reset signal SY_R is already active (previously activated by flip-flop 75).

The solution of FIG. 4 thus effectively protects device 70 in case of an external attack, but is more sensitive to the length of the internal reset signal IRS; in this case, the internal reset signal IRS generated by the internal reset sources 55 and the delay introduced by analog stretch block 72 are to be designed to be long enough.

The embodiments of FIGS. 2-4 operate well in protecting devices 50 and 70 and activating a reset procedure when an internal request is received, as above demonstrated.

In some instances, however, the devices 50 and 70 are not completely protected; in particular this may happen when reset pad circuit 52 is damaged or even destroyed by an outside attack. In this case, in fact, external reset request IOFT and reset state signal ZI may be floating, thus set input 75C is floating, causing also secure reset signal SE_R and system reset signal SY_R to be floating. A metastability situation thus exists and may propagated to the rest of device 50 that thus may not operate correctly.

Figure 5:
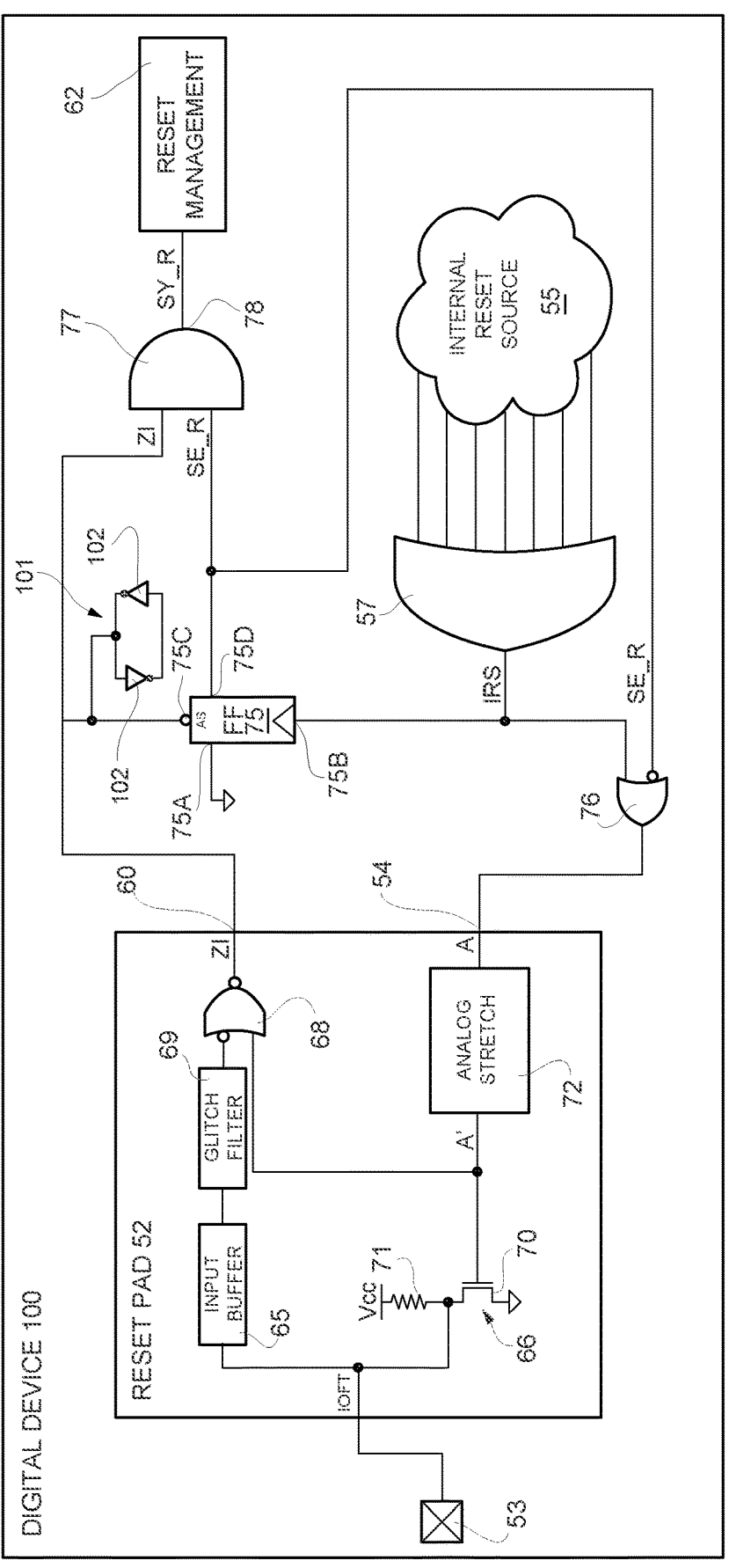

For protecting device 50 also from the above metastability risk, the embodiment of FIG. 5 may be used, comprising a state keeping element 101 that stores the level existing at the output of reset NOR gate 68 and is refreshed cyclically; in particular, when the device 50 operates correctly, reset state signal ZI adjourns the state of the state keeping element.

FIG. 5 shows a device 100 that has the same general structure as device 50 of FIG. 2, thus corresponding elements have been indicated with the same reference numbers.

Device 100 includes a state keeping element 101 coupled to set input 75C of flip-flop 75 and possibly arranged in close proximity thereto, for example at a distance of a few nanometers.

State keeping element 101 is formed for example by a bus-keeper, comprising here two inverters 102, that are anti-parallel coupled.

In case of metastability, state keeping element 101 maintains the last logic value of reset state signal ZI.

Thus, in presence of an attack of reset pad circuit 52, this condition may be discovered by an internal reset source 55 which asserts a reset action through internal reset signal IRS and secure reset signal SE_R; thereby, system reset signal SY_R is still asserted by secure reset signal SE_R and is never released.

This solution works well when the state keeping element 101 has time to register the state at the output of reset NOR gate 68.

According to another solution, flip-flop 75 may be replaced by a temporary memory element.

Figures 6, 7:
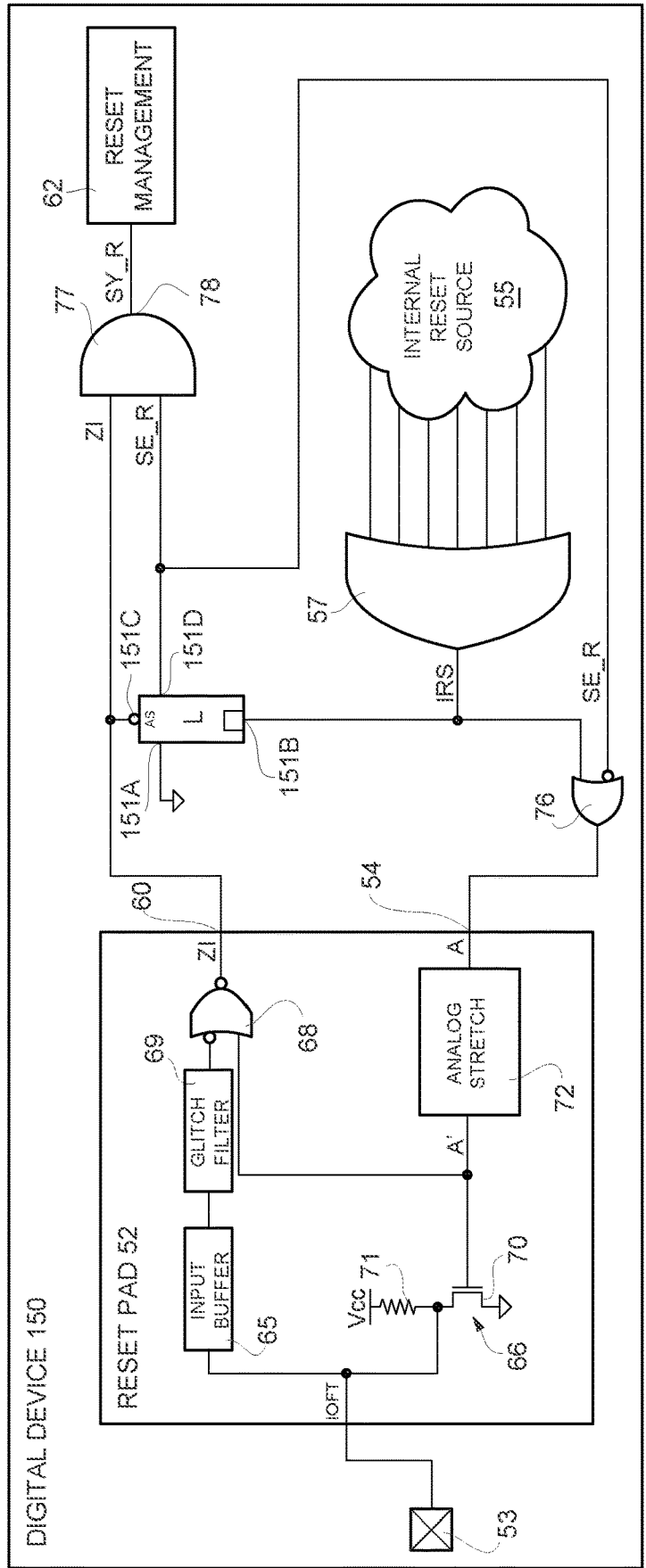
FIG. 7 is a circuit diagram of a possible implementation of a part of the digital device of FIG. 6.

For example, FIG. 6 shows a device 150 with the same general structure as device 50 of FIG. 2 (thus, corresponding elements have been indicated with the same reference numbers), wherein flip-flop 75 has been replaced by a latch (L) 151.

For example, latch 151 may be implemented as shown in FIG. 7.

Latch 151 has a data input 151A (corresponding to input D of FIG. 7) coupled to ground; reset input 151B (corresponding to clock input Clk in FIG. 7) coupled to the output of internal resource OR gate 57; a set input 151C (corresponding to inverted reset input $\overline{Rst}$ in FIG. 7) coupled to output of reset NOR gate 68; and an output 151D (corresponding to output Q in FIG. 7) coupled to the first input of AND gate 77 and to inverted input of feedback OR gate 76 and supplying secure reset signal SE_R.

Since a latch is level, rather than edge sensitive, it does not switch in case of metastability on its set input 151C and there is a higher probability that any level instability at the output of reset NOR gate 68 is resolved before latch closure.

In particular, if reset state signal ZI is low, latch 151 confirms a reset state by maintaining a high value at its output 151D; if not, it remains at its previous level and switches only when an internal reset source 55 activates the reset phase through internal resource OR gate 57.

Figure 8:
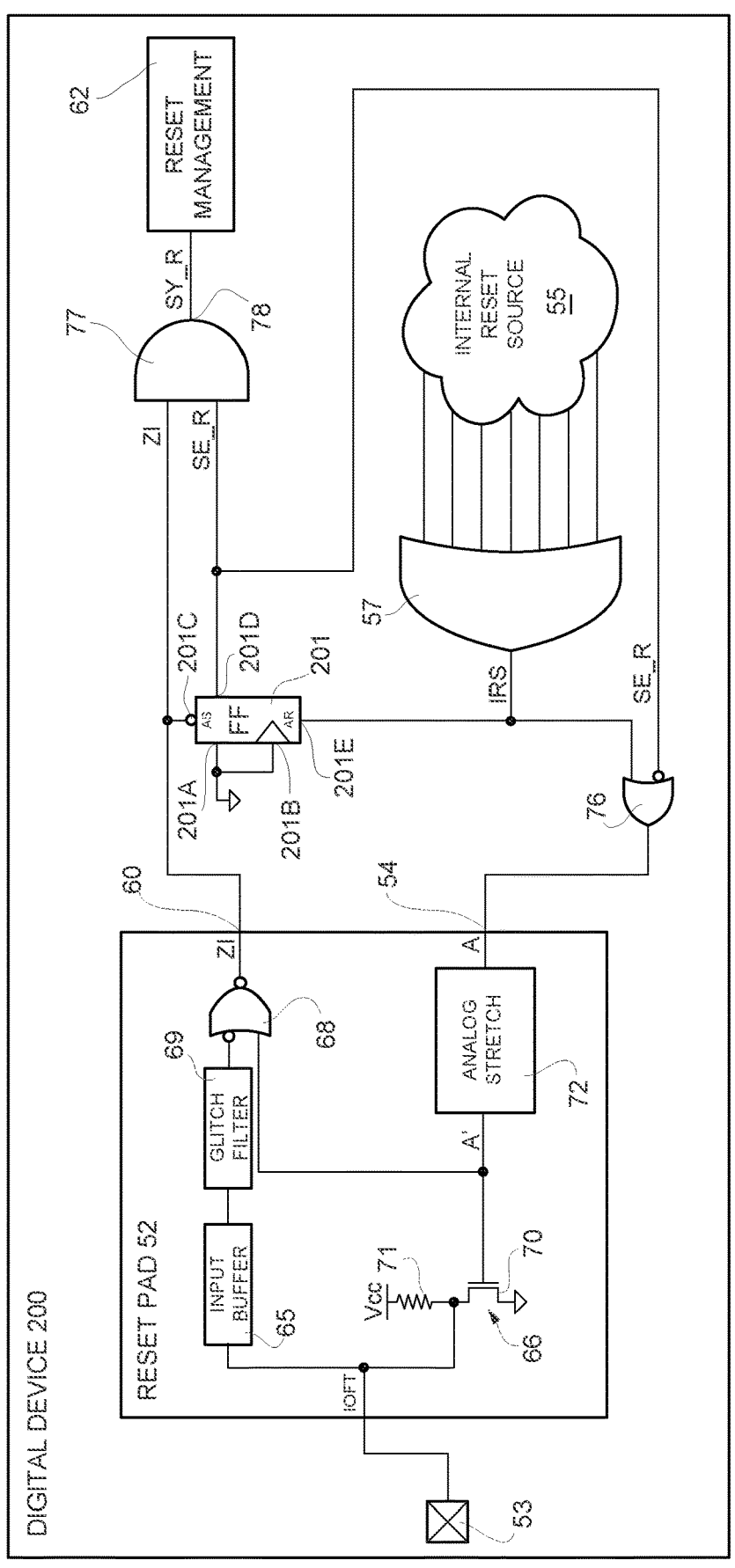
FIG. 8 is a schematic block diagram of another embodiment of the present digital device having a protection portion.

FIG. 8 shows a device 200 using a memory element where the reset input has priority on the set input; thereby a system reset may be generated by an internal reset source 55, independently on any metastability at the output of the reset pad circuit 52.

Device 200 of FIG. 8 has the same general structure as device 50 of FIG. 2 (thus, corresponding elements have been indicated with the same reference numbers and only different parts will be described).

In detail, device 200 comprises a flip-flop 201 of the S/R type, having a data input 201A, coupled to ground; a clock input 201B, also coupled to ground; an (asynchronous) set input 201C; an (asynchronous) reset input 201E coupled to output of internal resource OR gate 57; and an output 201D coupled to the first input of AND gate 77.

Device 200 has an asynchronous reset (reset input 201E) that has priority on asynchronous set (set input 201C) that always allows a system reset assertion. In other words, independently on the signal level of reset state signal ZI (and thus, any presence of metastability), when any internal reset source 55 causes generation of a pulse of internal reset signal IRS (e.g., after discovering the metastability), the latter causes starting of a reset phase.

The internal reset signal IRS is maintained until the system reset signal SY_R is propagated internally and the device 200 is able to interrupt the reset condition. Thereby, the device 200 returns back to its default condition.

Two cases may be thus possible:
1. The metastability causes the output 201D of flip-flop 201 to evolve to the rest condition: the reset request initiated by secure reset signal SE_R is cancelled and the device 200 exits the reset condition; and/or
2. The output 201D of flip-flop 201 does not switch and the device remains in the reset condition until situation above occurs.

Metastability conditions can be thus resolved.

As an alternative to the solution shown in FIG. 8, the clock input 201C of flip-flop 201 may be connected to any other fixed voltage, for example power supply.

In certain situations, it may be useful for the digital device to receive a direct in-time information of an existing (possible) attack of the reset pad circuit 52.

Figure 9:
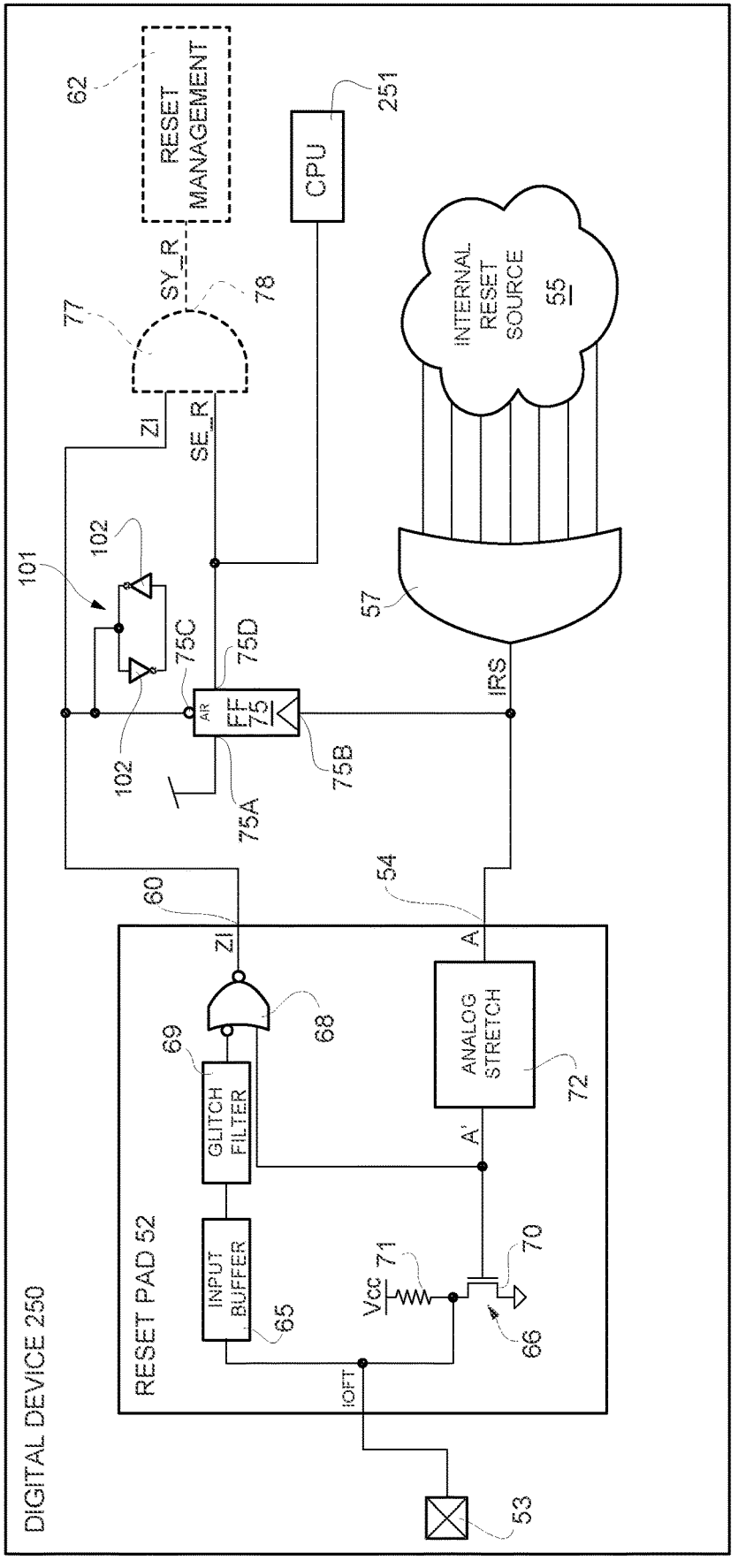
FIG. 9 is a schematic block diagrams of a different embodiment of the present digital device having a detection portion.

FIG. 9 shows, for example, a device 250 that allows internal units, for example a central unit 251, to be immediately informed.

Device 250 is here similar to device 70 of FIG. 4 (thus, corresponding elements have been indicated with the same reference numbers) and thus has the output of internal resource OR gate 57 directly coupled to internal reset input 54 of reset pad circuit 52.

In addition, device 250 of FIG. 9 also includes state keeping element 101 as in FIG. 5.

In FIG. 9, the output 75D of flip-flop 75 is coupled to a CPU 251, for example of a microcontroller. In addition, the output 75D of flip-flop 75 may be coupled to an inverted input of AND gate 77.

With the device 250 of FIG. 9, two situations may occur:
1. Not damaged PAD: when internal reset signal IRS switches to high, causing commutation of output 75D of flip-flop 75 to high, secure reset signal SE_R directly informs the CPU 251 that it will soon receive a reset request, by activating an interrupt. If the reset pad circuit 52 operates correctly, the reset request is activated, the system gets in a default state, the interrupt is canceled and the CPU 251 starts again from the default state; or
2. Damaged PAD: the CPU 251 receives the interrupt request (high level of internal reset signal IRS) and waits for the system reset. After a delay (that may be configured by software), if no reset request arrives, the CPU 251 may activate corrective measures to protect the device.

In the device 250, if system reset signal SY_R is generated, it may cause a pre-alarm situation to all parts, except for the CPU 251, so that the latter is completely operative and may manage the information coming directly, as above discussed.

Device 250 of FIG. 9, however, is not protected against an attack directed on the flip-flop 75, e.g., using electromagnetic, such as FIB (Focused Ion Beam) attacks which corrupt the output value of flip-flop 75.

A solution for increasing the robustness of a digital device against FIB attacks includes introducing some sort of redundancy.

Figure 10:
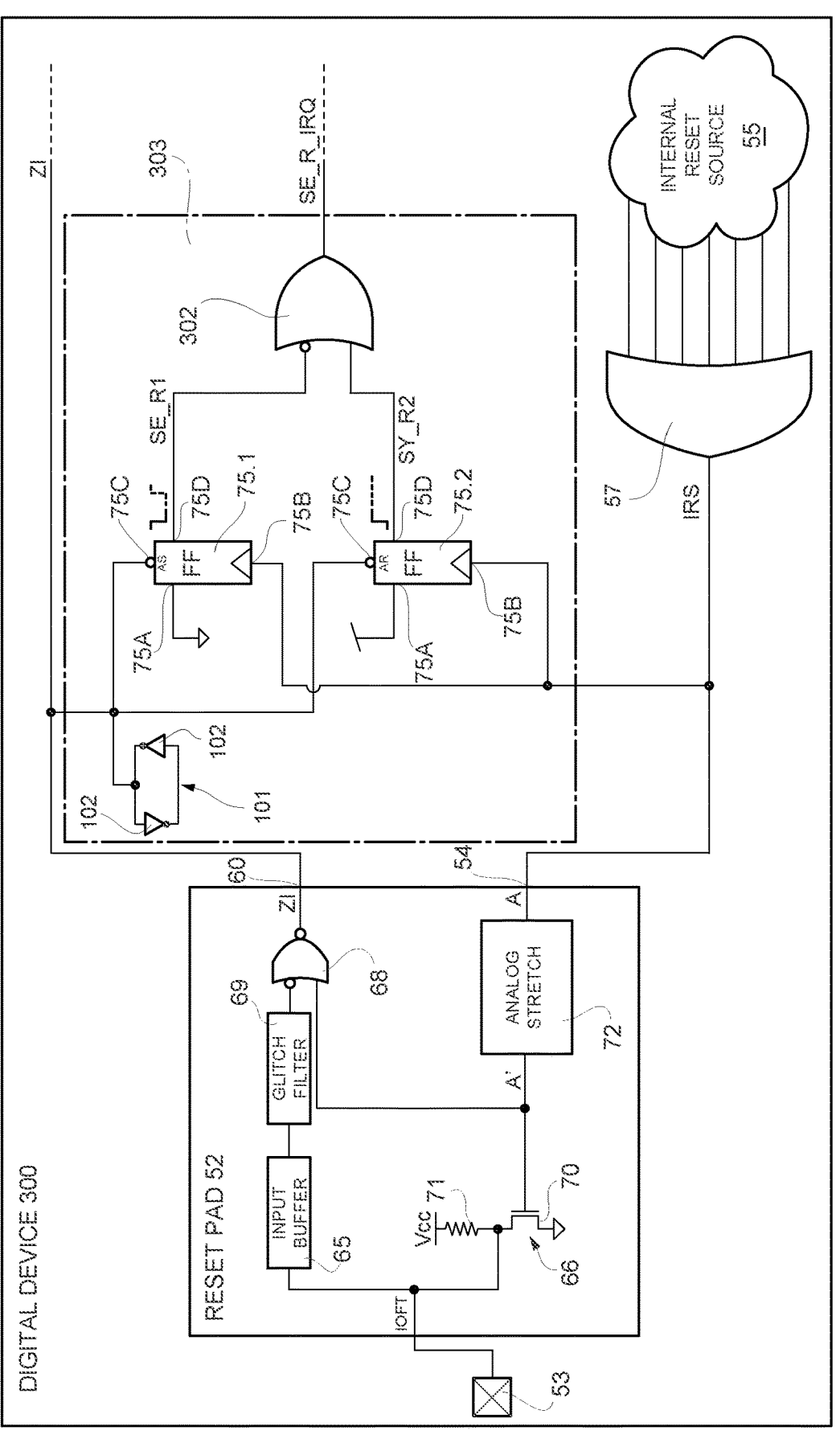
FIGS. 10 and 11 are schematic block diagrams of different embodiments of the present digital device.

For example, FIG. 10 shows a device 300 having the general structure of device 250 of FIG. 9 (thus, corresponding elements have been indicated with the same reference numbers), but includes a first flip-flop 75.1 and a second flip-clop 75.2.

First and second flip-flops 75.1, 75.2 have both their set inputs 75C coupled to the reset pad circuit output 60; their reset (clock) input 75B coupled to the output of internal resource OR gate 57; their data input 75A coupled to ground, respectively, to power supply Vcc; and their outputs 75D coupled to respective inputs of an interrupt request OR gate 302 that is configured to generate an interrupt secure reset signal SE_R_IRQ. In practice, flip-flops 75.1, 75.2 are configured to have opposed logic set levels (and opposed reset levels).

The outputs 75D of first and second flip-flops 75.1, 75.2, generating respective secure reset signal SE_R, are coupled to interrupt request OR gate 302 in an opposite way; in particular, in FIG. 10, output 75D of first flip-flop 75.1 is inverted. Thus, secure reset signal 302 is configured to generate a low level of interrupt secure reset signal SE_R_IRQ also when just one of outputs 75D of flip-flops 75.1, 75.2 switches at its set level (low at first flip-flop 75.1 and high at second flip-clop 75.2).

Accordingly, even if one of first and second flip-flops 75.1, 75.2 is destroyed or damaged by an attack intended to avoid starting a reset operation (with its associated security actions), it is not probable that also the other is; thus, the interrupt request OR gate 302 is able to receive at least one correct secure reset signal SE_R and cause activation of reset (through interrupt secure reset signal SE_R_IRQ) in case of an attack is detected by any internal source 55.

In addition, if an attacker is able to force any logic state on one of the flip-flops 75.1, 75.2, it cannot force two opposing levels. This is also represented in FIG. 10 by signals SE_R1 and SE_R2: if an attacker forces, e.g., a high level, secure reset signal SE_R1 at the output of first flip-flop 75.1 switches, but not secure reset signal SE_R2 at the output of second flip-flop 75.2, thereby interrupt request OR gate 302 is unaffected.

In the embodiment shown in FIG. 10, device 300 also has a state keeping element 101 for maintaining the last logic value of reset state signal ZI, although this is not mandatory.

The protection module including first and second flip-flops 75.1, 75.2, interrupt request OR gate 302 and state keeping element 101 is indicated in FIG. 10 by reference number 303.

The presence of two flip-flops 75.1, 75.2 thus increases robustness of the device 300 against attacks, for example laser attacks.

Figure 11:
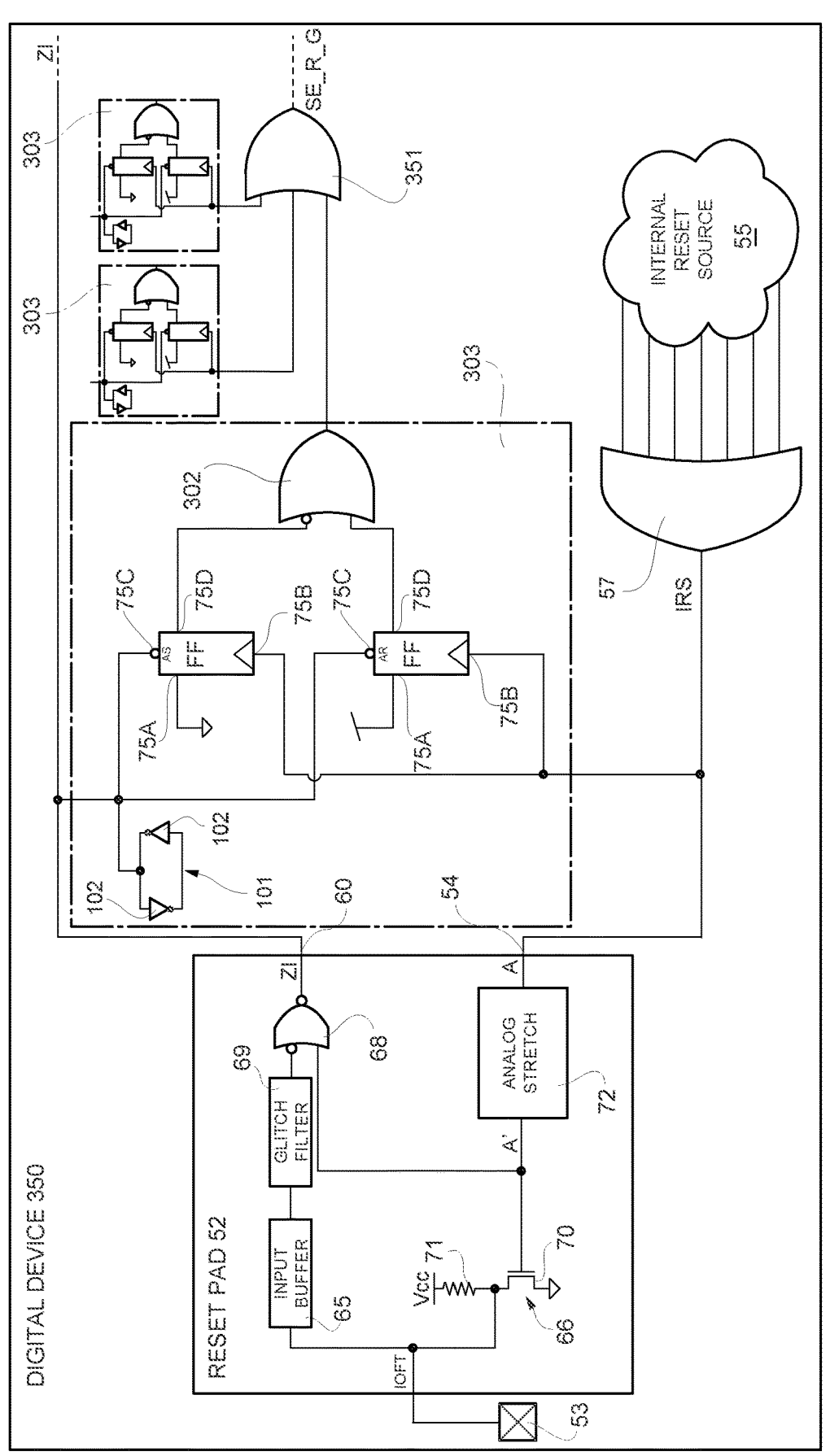

FIG. 11 shows a device 350 having a plurality of protection modules 303 whose outputs are coupled to a global reset OR gate 351 configured to generate a global secure reset signal SE_R_G.

By having a plurality of protection modules 303, each of which may activate a reset procedure, device 303 has an increase robustness against electromagnetic attacks and also against net cut.

Advantageously, the plurality of protection modules 303 may be distributed along the path coupling the reset pad circuit output 60 to reset manager 62 (not shown in FIG. 11), thereby increasing the ability of device 300 to resist to attacks.

Of course, the level of redundancy is to be considered in a trade-off with the high requested area.

Finally, it is clear that numerous variations and modifications may be made to the device described and illustrated herein, all falling within the scope of the invention as defined in the attached claims.

For example, flip-flop 75 may have the data input 75A coupled to a different reference voltage, for example power supply, in which case it may be inverted before being provided to AND gate 77.

In general, different logic elements, operating on opposed logic level may be envisaged buy the person skilled in the art, for performing the same o similar functions.

In addition, the various embodiments described above can be combined to provide further embodiments.

Example embodiments of the present disclosure are summarized hereinbelow.

Example 1. A digital device (50; 80; 100; 150; 200; 250; 300; 350), comprising:

a reset pad circuit (52) having a first input coupled to a first reset access port (53) and configured to receive a first reset request (IOFT), a second input coupled to a second reset access port (54), and an output (60), the reset pad circuit (52) configured to generate a first reset state signal (ZI) and having a reset request propagating portion (61, 68, 72) coupling the second input to the output of the reset pad circuit (52);

an internal reset activation gate (57) having at least one input coupled to an internal resource (55) and an output coupled with the second reset access port (54) of reset pad circuit (52), the internal reset activation gate (57) configured to generate a reset request (IRS);

a memory element (75; 151; 201; 75.1, 75.2) having a first input (75B; 151B; 201B) coupled to the output of the reset activation gate (57), a second input (75C; 151C; 201C) coupled to the output (60) of the reset pad circuit (52), and an output (75D; 151D; 201D; 75D), the memory element configured to generate a second reset state signal (SE_R; SE_R1, SE_R2) when receiving the reset request (IRS) until receiving the first reset state signal (ZI);

a reset forwarding gate (77) coupled to the outputs of the reset pad circuit (52) and the memory element (75; 151; 201; 75.1, 75.2) and configured to generate a system reset request (SY_R) in presence of the first reset state signal (ZI) and/or the second reset state signal (SE_R; SE_R1, SE_R2).

Example 2. A digital device according to example 1, wherein the reset forwarding gate (77) is an AND gate.

Example 3. A digital device according to example 1 or 2, wherein the internal reset activation gate (57) is an OR gate.

Example 4. A digital device according to any of preceding examples, wherein the memory element (75; 151; 201; 75.1, 75.2) is a flip-flop or a latch having a reset input forming the first input (75B; 151B; 201B) of the memory element and a set input forming the second input (75C; 151C; 201C) of the memory element.

Example 5. A digital device according to the preceding example, wherein the flip-flop (75; 201; 75.1, 75.2) is an asynchronous set, asynchronous reset D-type flip-flop (75) having a data input coupled to a reference potential, a clock input coupled to the output of the internal reset activation gate (57) and a set input coupled to the output of reset pad circuit (52), or an S/R flip-flop (201), having a data input and a clock input coupled together and to a reference potential, a reset input coupled to the output of the internal reset activation gate (57) and a set input coupled to the output of reset pad circuit (52).

Example 6. A digital device according any of the preceding examples, further comprising an internal reset maintaining unit (76) activated by the internal reset activation gate (57) and confirmed by the memory element (75; 151; 201; 75.1, 75.2), the internal reset maintaining unit (76) configured to generate an internal reset information supplied to the second input of the reset pad circuit (52).

Example 7. A digital device according to the preceding example, wherein reset maintaining unit (76) is an OR gate having a first input coupled to the output of the internal reset activation gate (57); a second input coupled to the output (75D; 151D; 201D; 75D) of the memory element (75; 151; 201; 75.1, 75.2) and an output directly coupled with the second input (54) of reset pad circuit (52).

Example 8. A digital device according to any of the preceding examples, further comprising a state keeping element (101) coupled to the second input (75C; 151C; 201C; 75C) of the memory element (75; 151; 201; 75.1, 75.2).

Example 9. A digital device according to any of the preceding examples, wherein the output (75D; 151D; 201D) of the memory element (75; 151; 201; 75.1, 75.2) is coupled with a central processing unit (251).

Example 10. A digital device according to any of the preceding examples, comprising a protective module (303) including:

the memory element, forming a first memory element (75.1) and configured to generate an own second reset state signal (SE_R1);

a second memory element (75.2), the second memory element having a first input (75B) coupled to the output (60) of the reset activation gate (57), a second input (75C) coupled to the output (60) of the reset pad circuit (52), and an output (75D), the second memory element configured to generate an own second reset state signal (SE_R2) of an opposite logical level than the second reset state signal (SE_R1) of first memory element (75.1) when receiving the reset request (IRS) until receiving the first reset state signal (ZI); and an interrupt gate (302) having a first and a second inputs coupled to the outputs of the first and second memory elements and an output configured to generate a system reset in presence of the second reset state signal (SE_R1) of first memory element (75.1) and/or of the second memory element (75.2).

Example 11. A digital device according to the preceding example, comprising a plurality of protective modules (303).

Example 12. A method for activating a reset procedure of a digital device, comprising a reset pad circuit (52); an internal reset activation gate (57); a memory element (75; 151; 201; 75.1, 75.2); and a reset forwarding gate (77), the reset pad circuit having a first (53) and a second (54) input and an output (60), the method comprising:

generating a reset request (IRS) by the internal reset activation gate (57);

forwarding the reset request (IRS) to a first input (75B; 151B; 201B; 75B) of the memory element (75; 151; 201; 75.1, 75.2) and to the second input (54) of reset pad circuit;

generating, by the memory element, a reset state signal (SE_R; SE_R1, SE_R2) when receiving the reset request (IRS);

activating, by the reset forwarding gate (77), a reset procedure upon receiving the reset state signal (SE_R; SE_R1, SE_R2);

propagating the reset request (IRS) in the reset pad circuit (52) to generate a feedback reset state signal (ZI); and deactivating, by the reset forwarding gate (77), the reset procedure upon receiving the feedback reset state signal (ZI).

13. A method according to the preceding example, wherein deactivating the reset procedure comprises supplying the feedback reset state signal (ZI) to a second input (75C; 151C; 201C; 75C) of the memory element (75; 151; 201; 75.1, 75.2).

Example 14. A method according to the preceding example, further comprising storing a logic level of the feedback reset state signal (ZI) on a state keeping element (101) coupled to the second input (75C; 151C; 201C) of the memory element (75; 151; 201; 75.1, 75.2).

Example 15. A method according to any of examples 12-14, further comprising generating a reset information on the first input (53) of the reset pad circuit (52) based on the reset request (IRS).

The invention claimed is:

1. A digital device, comprising:

a reset pad circuit having a first input coupled to a first reset access port and configured to receive an external reset request, a second input coupled to a second reset access port and configured to receive an internal reset request, and an output, wherein the reset pad circuit is configured to generate a first reset state signal and includes a reset request propagating portion coupling the first and second inputs to the output of the reset pad circuit;

an internal reset activation gate having at least one input coupled to an internal resource and an output coupled to the second reset access port of reset pad circuit, wherein the internal reset activation gate is configured to generate the internal reset request;

a memory element having a first input coupled to the output of the internal reset activation gate, a second input coupled to the output of the reset pad circuit, and an output, wherein the memory element is configured to generate a second reset state signal when receiving the internal reset request until receiving the first reset state signal; and a reset forwarding gate coupled to the output of the reset pad circuit and the output of the memory element and configured to generate a system reset request in response to one or more of the first reset state signal and the second reset state signal.

2. The digital device according to claim 1, wherein the reset forwarding gate is an AND gate.

3. The digital device according to claim 1, wherein the internal reset activation gate is an OR gate.

4. The digital device according to claim 1, wherein the memory element is one of a flip-flop or a latch.

5. The digital device according to claim 4, wherein the flip-flop is an asynchronous set, asynchronous reset D-type flip-flop having a data input coupled to a reference potential, a clock input coupled to the output of the internal reset activation gate and a set input coupled to the output of reset pad circuit.

6. The digital device according to claim 4, wherein the flip-flop is an S/R flip-flop, having a data input and a clock input coupled together and to a reference potential, a reset input coupled to the output of the internal reset activation gate and a set input coupled to the output of reset pad circuit.

7. The digital device according claim 1, further comprising an internal reset maintaining circuit activated by the internal reset activation gate and confirmed by the memory element, wherein the internal reset maintaining circuit is configured to generate an internal reset information supplied to the second input of the reset pad circuit.

8. The digital device according to claim 7, wherein the reset maintaining circuit is an OR gate having a first input coupled to the output of the internal reset activation gate, a second input coupled to the output of the memory element, and an output directly coupled with the second input of reset pad circuit.

9. The digital device according to claim 1, further comprising a state keeping element coupled to the second input of the memory element.

10. The digital device according to claim 1, further comprising a protective module:
   wherein the memory element forms a first memory element that is configured to generate a second reset state signal;
   a second memory element having a first input coupled to the output of the reset activation gate, a second input coupled to the output of the reset pad circuit, and an output, wherein the second memory element is configured to generate a second reset state signal having an opposite logical level than the second reset state signal generated by the first memory element when receiving the internal reset request until receiving the first reset state signal; and
   an interrupt gate having a first input and a second input coupled, respectively, to outputs of the first and second memory elements and an output configured to generate a system reset in response to one or more of the second reset state signal generated by the first memory element and the second reset state signal generated by the second memory element.

11. A method for activating a reset procedure of a digital device that includes a reset pad circuit, an internal reset activation gate, a memory element, and a reset forwarding gate, wherein the reset pad circuit has a first input configured to receive an external reset request, a second input configure to receive an internal reset request, and an output, the method comprising:
   generating the internal reset request by the internal reset activation gate;
   forwarding the internal reset request to a first input of the memory element and to the second input of the reset pad circuit;
   generating, by the memory element, a reset state signal in response to receipt of the internal reset request;
   activating, by the reset forwarding gate, a reset procedure in response to receipt of the reset state signal;
   propagating the internal reset request in the reset pad circuit to generate a feedback reset state signal; and
   deactivating, by the reset forwarding gate, the reset procedure in response to receipt of the feedback reset state signal.

12. The method according to claim 11, wherein deactivating the reset procedure comprises supplying the feedback reset state signal to a second input of the memory element.

13. The method according to claim 12, further comprising storing a logic level of the feedback reset state signal on a state keeping element coupled to the second input of the memory element.

14. The method according to claim 11, further comprising generating a reset information on the first input of the reset pad circuit based on the internal reset request.

* * * * *